United States Patent [19]

Heller et al.

[11] 4,396,412

[45] Aug. 2, 1983

[54] ION EXCHANGER FERTILIZERS

[75] Inventors: Harold Heller, Cologne; Herbert Corte, Leverkusen, both of Fed. Rep. of Germany

[73] Assignee: Bayer Aktiengesellschaft, Leverkusen, Fed. Rep. of Germany

[21] Appl. No.: 265,275

[22] Filed: May 20, 1981

[30] Foreign Application Priority Data

May 29, 1980 [DE] Fed. Rep. of Germany ....... 3020422

[51] Int. Cl.³ .............................................. C05F 11/02
[52] U.S. Cl. .......................................... 71/27; 71/903; 71/904; 71/DIG. 2; 47/DIG. 4; 424/82; 528/254; 521/30
[58] Field of Search ................. 71/1, 11, 27, 903, 904, 71/DIG. 2; 47/1 R, DIG. 4; 521/28, 30; 424/82; 528/254

[56] References Cited

U.S. PATENT DOCUMENTS 3,082,074 3/1963 Handley et al. ..................... 71/27 X
3,980,462 9/1976 Corte et al. ................................ 71/1

OTHER PUBLICATIONS

Rivoira in Rivista di Agronomia, Bologna 2 (1968), vol. 3/4, pp. 207–211.

*Primary Examiner*—Ferris H. Lander
*Attorney, Agent, or Firm*—Sprung, Horn, Kramer & Woods

[57] ABSTRACT

Process for improving the plant growth with the aid of ion exchanger fertilizers, comprising adding to the growth medium weakly basic anion exchangers which are charged with anionic chelate complexes of micronutrient cations and macronutrient and micronutrient anions to the extent of at least 60% of their total capacity together with weakly acid cation exchangers charged with nutrient cations to the extent of at least 60% of their total capacity. Furthermore fertilizers comprising a mixture of weakly basic anion exchanger which are charged with anionic chelate complexes of micronutrient cations and other micronutrient and macronutrient anions to the extent of at least 60% of their total capacity and weakly acid cation exchangers which are charged with nutrient cations to the extent of at least 60% of their total capacity.

15 Claims, No Drawings

ION EXCHANGER FERTILIZERS

The present invention relates to a process for improving plant growth by using weakly basic and weakly acid ion exchangers which are charged with nutrients, and to ion exchanger fertilisers, which contain both weakly basic and weakly acid ion exchangers charged with nutrient ions, for supplying plants with plant nutrients on a long-term basis.

Fertilisers based on ion exchangers charged with nutrients are known and have frequently been described (compare, for example, E. J. Hewitt: Sand and Water Culture method used in the study of plant nutrition, Commonwealth Agricultural Bureaux, Technical Communication No. 22, 2nd edition, 1966, page 61 et seq.). Complete fertilisers which are based on ion exchangers and contain, on a mixture of anion exchangers and cation exchangers, all the nutrient ions necessary for plant nutrition are of particular interest. Particular fertilisers of this type contain strongly basic or weakly basic anion exchangers which are partly, for example to the extent of 5%, relative to the total capacity of the anion exchanger, charged with anionic chelate complexes of micronutrient cations and in which the remainder of the exchange capacity is saturated with other macronutrient and micronutrient anions, and strongly acid cation exchangers which are charged with nutrient cations (see, for example, U.S. Pat. No. 3,980,462). Such fertilisers have proved particularly suitable when applied under normal conditions (compare Zierpflanzenbau 1978, Volume 12, pages 476–479 and 1977 Volume 1, pages 3–8).

However, it has been found that under extreme conditions of application, the amount of nutrient released from these ion exchangers to the plants per unit time and unit area may be too low to fulfil the nutrient requirement of the plants. Such cases may lead to a deficient supply of nutrients to the plants and to the known consequences, for example depression of growth.

The conditions of application are extreme, in particular, if, in the case that water with a low salt content, for example rainwater, is used for watering the plants, there are long diffusion paths between the ion exchangers and the plant roots and/or the diffusion cross-section is very constricted. Long diffusion paths and simultaneous constriction of the diffusion cross-section exist, for example, when the ion exchangers are used in so-called batteries (compare M. Schubert, Mehr Blumenfreude durch Hydrokultur (More Pleasure from Flowers through Hydroponic Culture), 6th edition, BLV Verlagsgesellschaft, Munich, 1979, pages 94–95).

However, since the use of batteries provides advantages, for example ease of replacement of ion exchangers after exhaustion, proposals have already been made to use mixtures of ion exchangers fertilisers and gypsum in batteries to ensure more rapid discharge of the ion exchangers and thus an increase in the flow of nutrients (see DE-OS (German Published Specification) 2,819,871). This proposal is based on the assumption that gypsum is dissolved only according to its solubility, even in the presence of ion exchangers, and addition of a large amount of gypsum thus represents a suitable store of salt which dissolves only slowly and thus is suitable for promoting the release of the nutrients from the ion exchangers over a long period of time. This assumption, however, is based on an error, since it is known that sparingly soluble salts, for example gypsum, are rapidly dissolved completely by ion exchangers (see F. Helfferich, Ion Exchange, McGraw-Hill Book Comp., New York, 1962, pages 226–229 and 295–299), equivalent amounts of readily soluble salts passing into solution. In the present case, these are the nutrient salts with which the ion exchangers are charged. It is thus not possible for slow release of the nutrients from ion exchangers charged with nutrients to be achieved by adding gypsum. Rather, the addition of gypsum has the effect of a sudden sharp rise in the nutrient concentration in the solution and a rapid discharge of the ion exchangers which corresponds to the amount of gypsum used. The desired slow release of the nutrient ions is not achieved by adding gypsum. Moreover, salt damage may occur to plants which are sensitive to salts, such as orchids, bromelias, azaleas, ferns and young plants generally, as a result of rapid release of the nutrient salts (see F. Penningsfeld et al.: Hydrokultur und Torfkultur (Hydroponic Culture and Peat Culture), pages 40–42, Ulmer Verlag, Stuttgart, 1966).

It has now been found that release of the nutrient ions matched to the nutrient requirement of the plants can be achieved under extreme conditions of application by a procedure in which the weakly basic anion exchangers charged with anionic chelate complexes of micronutrient cations and macronutrient and micronutrient anions (a) are charged to the extent of at least 60%, preferably to the extent of at least 80%, of their total capacity and (b) are used together with weakly acid cation exchangers, which are likewise charged to the extent of at least 60%, preferably to the extent of at least 80%, of their total capacity.

As a result of this conjoint use of highly charged weakly basic and weakly acid ion exchangers charged with nutrient ions, the release of the nutrient salts no longer decreases as the salt content of the aqueous medium surrounding them decreases, but increases. That is to say, in contrast to the use of the known fertilisers based on ion exchangers, for example the fertilisers described in U.S. Pat. No. 3,980,462, when highly charged weakly basic and weakly acid ion exchangers are used together, the more nutrient salts are released to the aqueous medium surrounding them the lower the salt concentration thereof is. As a result of this property, conjoint use of weakly basic and weakly acid ion exchangers charged with nutrients ensures that the plants are sufficiently supplied with nutrients, even if water with a low salt content is used for watering the plants, if containers with a restricted diffusion cross-section are used, or at the end of the period of fertiliser application, when the salt content of the nutrient solution has already fallen as a result of the salts being used up.

Mixtures of weakly basic and weakly acid ion exchangers charged with nutrient ions together with strongly basic and strongly acid ion exchangers charged with nutrient ions have already been used as fertilisers (see G. Rivoira, Rivista di Agronomia, Bologna 2 (1968), Volume 3/4, pages 207 to 211). The weakly basic anion exchangers and weakly acid cation exchangers used in these four-component mixtures were, however, only partly charged, to the extent of about 20% of their total capacity, as can be seen from the charging method described. These mixtures thus exhibited only the known release of nutrient ions from the ion exchangers, which increases as the salt content of the surrounding aqueous medium increases.

Experiments with mixtures of weakly acid and strongly basic ion exchangers charged with nutrients are described in Natur, Volume 198 (1963), pages 1,328–1,329. These mixtures also only exhibit the usual release of nutrient salts, which decreases as the salt content of the aqueous medium surrounding them decreases.

The conjoint use, according to the invention, of the weakly basic and weakly acid ion exchangers highly charged with nutrient ions can be effected in various ways. Thus, the ion exchangers can be employed individually, that is to say separately from one another, or in the form of mixtures. It is preferable to use mixtures.

The invention thus furthermore relates to ion exchanger fertilisers consisting of mixtures of weakly basic anion exchangers charged with anionic chelate complexes of micronutrient cations and other micronutrient and macronutrient anions, and cation exchangers charged with nutrient cations, which are characterised in that they contain mixtures of weakly basic anion exchangers which are charged to the extent of at least 60%, preferably to the extent of at least 80%, of their total capacity with anionic chelate complexes of micronutrient cations and other micronutrient and macronutrient anions, and weakly acid cation exchangers which are charged to the extent of at least 60%, preferably to the extent of at least 80%, of their total capacity with nutrient cations.

The weakly basic anion exchangers which are charged with anionic chelate complexes of micronutrient cations and other macronutrient and micronutrient anions and which are to be used in the process according to the invention or in the fertilisers according to the invention are anion exchangers in which the exchange capacity (=total capacity=content of weakly basic groups) is saturated with anionic chelate complexes of micronutrient cations to the extent of 0.25 to 25%, preferably to the extent of 0.5 to 15%, and their remaining exchange capacity is saturated with macronutrient anions and other micronutrient anions.

The ratio in which the highly charged weakly basic and weakly acid ion exchangers are used in the process according to the invention or in the fertilisers according to the invention are applied can vary within wide limits and depends, inter alia, on the desired pH value in the substrate. The amount of weakly acid groups is preferably 10 to 90%, and preferentially 10 to 50%, relative to the sum of weakly basic and weakly acid groups.

All the weakly basic and weakly acid synthetic resin ion exchangers are suitable for the process according to the invention and the fertilisers according to the invention. The ion exchangers can be polymerisation resins or condensation resins. They can have a gel-type or macroporous structure.

By weakly basic anion exchangers, there are to be understood the known anion exchangers containing primary, secondary and tertiary amino groups, and by weakly acid cation exchangers there are to be understood the known cation exchangers containing carboxyl groups, phosphinic acid groups and phenolic hydroxyl groups, and also the weakly acid cation exchangers which contain aminocarboxylic acid groups and form chelate complexes. These weakly basic anion exchangers and weakly acid cation exchangers and their preparation are described, for example, in F. Helfferich, loc. cit., pages 26 to 71 and Ullmanns Enzyklopadie der technischen Chemie (Ullmanns Encyclopaedia of Industrial Chemistry), 4th edition, Volume 13, 1977, pages 295–309.

In particular, weakly basic anion exchangers and weakly acid cation exchangers which can be employed for the so-called Sirotherm process may also be used. The selection criteria and the preparation of these ion exchangers are described, for example, in: Aust. J. Chem. 19 (1966) pages 561–587, 589–608 and 765–789; and in U.S. Pat. Nos. 3,645,922, 3,888,928 and 3,619,394.

The weakly basic anion exchangers based on crosslinked polyacrylamides and crosslinked polyvinylbenzylamines and the weakly acid cation exchangers based on crosslinked poly(meth)acrylic acid have proved particularly suitable.

The fertilisers according to the invention can contain all the essential macronutrients and micronutrients, anionic nutrients, such as nitrate, phosphate, sulphate, molybdate and borate, being bonded to anion exchangers and cationic nutrients, such as potassium, ammonium, calcium and magnesium, being bonded to cation exchangers. Micronutrients such as iron, manganese, copper, chromium, cobalt and zinc are bonded to weakly basic anion exchangers in the form of anionic chelate complexes. The fertilisers according to the invention preferably contain the macronutrients nitrogen, phosphorus and potassium, which are of particular importance for healthy plant development, and the micronutrients boron, as borate, molybdenum, as molybdate and iron, copper, manganese and zinc, as anionic chelate complexes. Weakly basic anion exchangers charged with such anionic chelate complexes are described, for example, in U.S. Pat. No. 3,980,462. The exchangers can contain nitrogen as nitrate nitrogen and ammonium nitrogen in a molar ratio of 90:10 to 50:50, and phosphorus as dihydrogen phosphate or hydrogen phosphate.

The proportions of individual nutrients used in the fertilisers according to the invention can vary within wide limits and are advantageously matched to the particular nutrient requirements of the various species of plants. Proportions which are particularly suitable are described in the literature (see U.S. Pat. Nos. 3,082,074 and 3,980,462; and E. J. Hewitt: Sand and Water Culture method used in the study of plant nutrition, Commonwealth Agricultural Bureaux, Technical Communication No. 22, 2nd edition, 1966, page 61 et seq.).

The high charge of the weakly acid and weakly basic ion exchangers with the nutrient ions which is required according to the invention can be effected in various ways: thus, the weakly acid cation exchangers can be charged by stirring the $H^+$ form with an approximately 10% strength aqueous solution of the free base containing the desired cation, for example an aqueous solution of potassium hydroxide, ammonium hydroxide, calcium oxide or magnesium oxide, until equilibrium is established. The weakly basic anion exchangers are advantageously treated, in the $OH^\ominus$ form, first with a 0.1–5% strength aqueous solution of the anionic chelate complexes of the micronutrient cations, then with a 0.01–1% strength aqueous solution containing the micronutrient anions, and finally with an approximately 10% strength solution of the free acid containing the desired macronutrient anion, for example nitric acid, sulphuric acid or phosphoric acid, or a mixture of these acids, until equilibrium is established. It is also possible first to stir the $OH^\ominus$ form of the weakly basic anion exchangers with a 0.1 to 5% strength aqueous solution of a chelating agent, which is in the form of the free acid, and then to add a 0.1 to 5% strength aqueous solution of one or more salts of micronutrient cations to this mixture. After equilibrium is established, the anion exchanger which has thus been charged with the anionic chelate complexes is further charged, as indicated above, with micronutrient anions and macronutrient anions.

The rate of charging can be increased by adding a small amount of a salt, for example potassium nitrate. After the charging operation, the ion exchangers are separated off from the aqueous solution by filtration or centrifugation and are dried separately. The charged ion exchangers can be employed individually, in combination, or as a mixture.

However, it is also possible to charge the weakly acid and weakly basic ion exchangers simultaneously, by charging a mixture of the weakly basic anion exchanger in the $OH^-$ form and the weakly acid cation exchanger in the $H^+$ form in a 0.5 to 3 molar fertiliser salt solution with a content of anionic chelate complexes of micronutrient cations of 0.01 to 1 mol/l at temperatures of 0° to 70° C., preferably 5° to 25° C., whilst stirring. In certain circumstances it may also be advantageous first to stir the ion exchanger mixture with an aqueous solution of the anionic chelate complexes of the micronutrient cations, until these have been adsorbed onto the anion exchanger, and then to continue the charging operation by adding further fertiliser salts. If the ion exchanger mixture contains an excess of weakly basic or weakly acid groups, this excess is saturated, before or after the charging with fertiliser salts, by adding acid, for example nitric acid, or base, for example potassium hydroxide.

The ion exchanger mixture is then again isolated by filtration or centrifugation. Whilst a mixture of the moist ion exchanger resins charged with nutrients, which can also be dried if required, is obtained by this process, the individual components, which can be employed individually in combination, or as a mixture, are obtained by the former process.

The combinations, according to the invention, of highly charged weakly basic anion exchangers and weakly acid cation exchangers can be used together with strongly basic anion exchangers charged with nutrient ions and/or strongly acid cation exchangers charged with nutrient cations, without the property of the combinations of highly charged weakly basic anion exchangers and weakly acid cation exchangers of releasing an increased amount of nutrient salts as the salt content of the surrounding aqueous medium decreases being impaired by these additional components. The strongly acid cation exchangers which can additionally be used may be charged with cationic nutrients such as potassium, ammonium, calcium or magnesium, and the strongly basic anion exchangers may be charged with anionic nutrients such as nitrate, phosphate, sulphate, borate or molybdate.

The ratio of strong ion exchangers to weak ion exchangers can vary within wide limits. The proportion of the total cation exchange capacity which is made up of strongly acid cation exchangers can be up to 80%, preferably up to 50%. The proportion of total anion exchange capacity which is made up of strongly basic anion exchangers can likewise be up to 80%, preferably up to 50%.

The general sense of these statements applies in the same way to the proportions of strongly basic or strongly acid groups when anion exchangers which, in addition to weakly basic groups, also contain strongly basic groups, or cation exchangers which, in addition to weakly acid groups, also contain strongly acid groups, are used. The addition of customary strongly acid cation exchangers charged with nutrients is of particular interest.

The process according to the invention and the fertilisers according to the invention are particularly advantageously applied in hydroponic culture, especially when water with a low salt content is used for watering the plants and the ion exchanger fertiliser is used in replaceable nutrient batteries in which the diffusion cross-section for the nutrients is restricted at the outlet by perforated plates or slotted plates, fleeces or films. The process according to the invention ensures that the plants are well-supplied with nutrients over a long period, even under extreme conditions of application.

The conjoint use, according to the invention, of the highly charged weakly basic and weakly acid ion exchangers can be effected in various ways. It is thus possible, for example, to accommodate the two components by themselves in separate chambers of a two-chamber battery or in two individual batteries; however, it is also possible to accommodate them together, after mixing, in a battery with only one chamber.

The process according to the invention and the fertilisers according to the invention can, however, also be applied in the most diverse naturally occurring and synthetic substrates in which plants grow.

Application is effected by the methods customary in agriculture and horticulture: for example, the components of the fertilisers according to the invention can, individually in combination or as a mixture, be mixed with the naturally occurring or synthetic substrate or be incorporated in the soil by digging or ploughing. They can furthermore be scattered over the plants or their environment as a top dressing.

The fertilisers according to the invention can be used either as such or, if appropriate, as a mixture with other fertilisers, extenders, plant protection agents and/or growth regulators.

The fertilisers according to the invention can be in the form of fine beads, or larger balls, in the form of granules, in pulverulent form, in the form of lumps or in the form of mouldings.

The amounts of highly charged weakly basic and weakly acid ion exchangers employed, when used conjointly, in the process according to the invention and the amounts of ion exchanger mixtures, charged with nutrients, according to the invention which are employed can vary within relatively wide limits. They essentially depend on the particular nutrient requirement of the plants. In general, the amounts applied are between 0.001 and 0.1 l of ion exchanger per liter of growth medium preferably between 0.002 and 0.05 l per liter of growth medium.

The process according to the invention and the fertilisers according to the invention are suitable for uniformly supplying useful plants and ornamental plants on a long-term basis. The useful plants include, for example, herbs for cooking, such as parsley (*Petroselinum sativum*), chives (*Allium schoenoprasum*) and marjoram (*Origanum majorana*), vegetables, such as lettuce (*Lactuca sativa*), radishes (*Raphanus sativus*), cucumbers (*Cucumis sativus*) and tomatoes (*Solanum lycopersicum*); small fruits, such as strawberries (*Fragaria speciosa*), currants (*Ribes rubrum petracum*), gooseberries (*Ribes grossularia*) and wine (*Vitris vinifera*); pineapples (*Ananas sativus*); citrus varieties; cherries (*Prunus*); and peaches (*Prunus persica*).

Examples of ornamental plants which may be mentioned are: aechmea (*Aechmea fasciata*), ivy (*Hedera helix*), croton (*Codiaeum variegatum*), palms (*Chamaedorea elegans*), philodendrons (Philodendron red emerald; *Philodendron scandens; Monstera deliciosa*), euphorbias (*Euphorbia pulcherrima*), ferns (*Adiantum scutum roseum*), rubber plants (*Ficus elastica Decora, Ficus robusta, Ficus diversifolia* and *Ficus benjamina*), aphelandra (*Aphelandra squarrosa dania*), maranta (*Maranta makoyana*), chrysanthemums (Yellow Delaware), anthurias (*Anthurium scherzerianum*), ericaceae (*Erica gracilis*), azaleas (*Rhododendron simsii*), dieffenbachias (*Dieffenbachia amoena;* Tropic white), dracaenas (*Dracaena terminalis* and *Dracaena deremensis*), hibiscus (*Hibiscus rosasinensis*), lady's slipper (Cypripedium), guzmania (*Guzmania minor*), pachystachys (Pachystachys), peperonia (*Peperonia glabella*), staghorn ferns (*Platycerium alcicorne*), scindapsus (*Scindapsus aureus*), spatiphyllum (*Spatiphyllum wallisii*) and vriesea (*Vriesea splendens*).

The degree of charging (in %) given in the following examples relates to the total capacity of the ion exchanger resin in question.

EXAMPLE 1

To prepare an ion exchanger fertiliser containing nitrogen, sulphur and iron, 500 ml of each of the nutrient-charged ion exchanger resins A and B described below are mixed.

The nutrient content of the mixture is:
nitrogen: 19.5 mg/ml
nitrate nitrogen in the above: 6 mg/ml
sulphur: 3 mg/ml
iron: 5 mg/ml The content of weakly acid groups, relative to the total amount of weakly acid groups and weakly basic groups, is 52%.

The nutrient-charged ion exchanger resins A and B used were obtained as follows:

Resin A 500 ml of a weakly basic anion exchanger in the free base form (content of weakly basic groups: 2.34 mols/l), prepared by aminomethylation of a styrene bead polymer which has been crosslinked with 8% of divinylbenzene and rendered macroporous by adding 60% (relative to the monomer mixture) of a $C_{12}$-hydrocarbon mixture, were suspended in 1,000 ml of completely demineralised water, and, at 20° to 25° C., whilst stirring, 125 mmols of ethylenediamine-tetraacetic acid and 125 mmols of iron-II sulphate were added successively, and 1.5 N nitric acid was then added in portions until a constant pH value of 4.3 had been established in the aqueous phase. The nitric acid consumption was 360 ml.

The ion exchange resin charged in this way was filtered off. Yield: 640 ml.
Content of nitrate nitrogen: 12 mg/ml;
Degree of charging: 47%;
Content of iron: 10 mg/ml;
Degree of charging: about 10%;
Content of sulphur: 6 mg/ml;
Degree of charging: 21%.

Resin B 500 ml of a weakly acid cation exchanger in the acid form (content of weakly acid groups: 3.2 mols/l), prepared by alkaline saponification of a methacrylic acid methyl ester bead polymer which had been crosslinked with 5% of divinylbenzene and rendered macroporous by the addition of 30% of isooctane (relative to the monomer mixture), were suspended in a solution of 5 g of ammonium chloride in 1,000 ml of completely demineralised water, and 375 ml of approximately 10% strength ammonia solution were added at 20° to 25° C. in the course of 2 hours, whilst stirring. After stirring the mixture for 16 hours, a pH value of 9.9 had been established in the aqueous phase. The charged cation exchange resin was then separated off from the aqueous phase. Yield: 810 ml, content of ammonium nitrogen: 27 mg/ml; degree of charging: 98%.

EXAMPLE 2

To prepare an ion exchanger fertiliser containing the main nutrients nitrogen, phosphorus and potassium and the micronutrients iron and manganese, the nutrient-charged exchanger resins A, B, C, D and E described below are mixed in the amount given in the following table. A fertiliser with a nutrient content which can likewise be seen from the table is obtained.

TABLE

| Resin | Amount g | Amount of ion-exchanging groups (mmols/100 g of mixture) | | | | Nutrient | Nutrient content g/100 g of mixture |
|---|---|---|---|---|---|---|---|
| | | weakly basic | strongly basic | weakly acid | strongly acid | | |
| A | 89 | 330 | — | — | — | nitrate nitrogen | 2.9 |
| B | 16 | 41 | 8 | — | — | phosphorus | 0.7 |
| | | | | | | manganese | 0.1 |
| C | 8 | — | — | 60 | — | potassium | 1.5 |
| D | 10 | — | — | 87 | — | ammonium nitrogen | 0.7 |
| E | 16 | — | — | — | 56 | potassium | 1.5 |

The content of the mixture is as follows: 28% of weakly acid groups, relative to the total amount of weakly acid and weakly basic groups; 28% of strongly acid groups, relative to the total amount of acid groups; and 2% of strongly basic groups, relative to the total amount of basic groups.

The nutrient-charged ion exchange resins A to E used were obtained as follows:

Resin A 500 ml of a weakly basic anion exchanger in the free base form (content of weakly basic groups: 3 mols/l), prepared by aminomethylation of a styrene bead polymer which had been crosslinked with 4% of divinylbenzne, were suspended in 500 ml of completely demineralised water, and 93 ml of nitric acid (about 65% strength) and 225 mmols of the iron-III chelate complex of ethylenediamine-tetraacetic acid were added at 20° to 25° C., whilst stirring. After equilibrium had been established, the pH value in the aqueous phase was 4.5. The anion exchange resin thus charged was separated off from the aqueous solution by filtration and dried in air at room temperature for 20 hours. Yield: 404 g of a free-flowing product.

Content of nitrate nitrogen: 45 mg/g;
Degree of charging: 87%;
Content of iron: 9 mg/g;
Degree of charging: about 5%;
Water content: 20% by weight.

Resin B 500 ml of a moderately basic anion exchanger in the OH⁻ form (content of weakly basic groups: 1.27 mols/l, content of strongly basic groups: 0.25 mol/l), prepared by aminolysis of an acrylic acid methyl ester bead polymer, which had been crosslinked with 5% of divinylbenzene and 3% of 1,7-octadiene, with N,N-dimethylaminopropylamine and subsequent partial quaternisation with methyl chloride, were suspended in 500 ml of completely demineralised water, and 57 g of phosphoric acid (about 85% strength) and 75 mmols of the manganese-II chelate complex of ethylenediamine-tetraacetic acid were added at 20° to 25° C., whilst stirring. After subsequently stirring the mixture for 16 hours, the pH value of the aqueous phase was 4.6. The anion exchange resin thus charged was filtered off and dried in air at room temperature for 72 hours. Yield: 246 g of a free-flowing product.

Content of phosphorus: 62 mg/g;
Degree of charging: about 90%;
Content of manganese: 9 mg/g;
Degree of charging: about 6%;
Water content: 22% by weight.

Resin C 780 ml of a weakly acid cation exchanger in the acid form (content of weakly acid groups: 4.6 mols/l), prepared by acid hydrolysis of an acrylonitrile bead polymer which had been crosslinked with 7% of divinylbenzene and 2% of 1,7-octadiene, were suspended in 1 l of 0.03 N potassium chloride solution, and 3.4 mols of potassium hydroxide (in the form of a 5 molar aqueous solution) were added in portions at 20° to 25° C., whilst stirring. After subsequently stirring the mixture for 12 hours, a pH value of 9 had been established in the aqueous phase. The charged cation exchange resin was filtered off and partially dried at 70° C. in vacuo (130 mbars). Yield: 475 g of a free-flowing product. 'Content of potassium: 267 mg/g;

Degree of charging: 90%;
Water content: 5.9% by weight.

Resin D 750 ml of the weakly acid cation exchanger in the acid form used for the preparation of resin C in Example 2 were suspended in 1 l of 0.05 N ammonium chloride solution, and 270 ml of aqueous ammonia solution (about 23% strength) were added at room temperature in the course of 4 hours, whilst stirring. After subsequently stirring the mixture for 12 hours, a pH value of 9 had been established in the aqueous phase. The cation exchange resin thus charged was isolated by filtration and partially dried at 90° C. in vacuo (130 mbars). Yield: 395 g of a free-flowing product.

Content of ammonium nitrogen: 101 mg/g;
Degree of charging: 83%;
Water content: 9.4% by weight.

Resin E 550 ml of a commercially available strongly acid cation exchanger resin on a styrene bead polymer, crosslinked with 8% of divinylbenzene, in the acid form (content of strongly acid groups: 2.1 mols/l) were charged with potassium in a filter tube by passing over a 2.5% strength potassium chloride solution until the runnings from the filter tube were free from acid. The exchanger was then washed until free from chloride and subsequently dried in air at room temperature for 24 hours. Yield: 345 g of a free-flowing product.

Content of potassium: 129 mg/g;
Water content: 24% by weight.

EXAMPLE 3

To prepare an ion exchanger fertiliser containing the main nutrients nitrogen and potassium and the micronutrient iron, 50 ml of the weakly basic anion exchanger used for the preparation of resin A in Example 2 (content of weakly basic groups: 150 mmols) and 33 ml of the weakly acid cation exchanger used for the preparation of resin C in Example 2 (content of weakly acid groups: 150 mmols) are introduced into a solution of 1.5 mols of potassium nitrate and 6 mmols of the iron-III chelate complex of ethylenediamine-di-(o-hydroxyphenyl)-acetic acid in 500 ml of completely demineralised water. The suspension was stirred at room temperature until the ion exchanger was completely charged. After stirring the suspension for 120 hours, a constant specific conductivity of 145 mS/cm (20° C.) and a pH value of 7.5 had been established in the aqueous phase. The ion exchanger mixture thus charged was filtered off, rinsed with methanol and then partially dried at 40° C. Yield: 62 g of a free-flowing product.

Content of nitrate nitrogen: 33 mg/g;
Degree of charging: 97%;
Content of iron: 4 mg/g;
Degree of charging: 3%;
Content of potassium: 93 mg/g;
Degree of charging: 98%;
Water content: 6% by weight.

EXAMPLE 4

To prepare an ion exchanger fertiliser which contains the main nutrients nitrogen, phosphorus, potassium and sulphur and the micronutrients, boron, iron, copper, manganese, molybdenum and zinc, and which is particularly suitable as a complete fertiliser for hydroponic culture of plants using water with a low salt content, 490 ml of the moist, weakly basic anion exchanger A which is charged with nitrate, phosphate, sulphate and the micronutrients and which is described below, and 150 ml of the weakly acid cation exchanger B which is charged with potassium and ammonium and is described below, are mixed, and the mixture is partially dried at 60° C. in vacuo (24 mbars) in a rotary evaporator. Yield: 315 g of a free-flowing product.

Water content: 7% by weight.

The nutrient content of the fertiliser per 100 g is as follows:

Nitrate nitrogen: 3.5 g
Ammonium nitrogen: 0.7 g
Phosphorus: 0.8 g
Potassium: 3.0 g
Boron: 2 mg
Iron: 102 mg
Copper: 1 mg Manganese: 7 mg
Molybdenum: 7 mg
Zinc: 1 mg
Sulphur: 1 mg
Weakly basic groups: 324 mmols
Weakly acid groups: 135 mmols (=29%, relative to the total content of weakly basic groups and weakly acid groups in the fertiliser).

The nutrient-charged resins A and B used were obtained as follows:

Resin A 1,000 ml of the weakly basic anion exchanger in the free base form used for the preparation of resin A in Example 2 were suspended in 1,000 ml of completely demineralised water, and 5.96 g of ethylenediaminetetraacetic acid, 27 g of phosphoric acid (about 85% strength) 0.57 g of $Na_2B_4O_7.10H_2O$, 0.11 g of $(NH_4)_6Mo_7O_{24}.4H_2O$, 5 g of $FeSO_4.7\,H_2O$, 0.3 g of $MnSO_4.H_2O$, 0.045 g of $CuSO_4.5H_2O$, 0.05 g of $ZnSO_4.7H_2O$ and 250 g of nitric acid (about 65% strength) were added successively at room temperature in the course of 3 hours, whilst stirring.

After subsequently stirring the mixture for 20 hours, the pH value of the aqueous phase was 4.5. The anion exchange resin thus charged was separated off from the aqueous phase by filtration. Yield: 1,440 ml of moist product.

Content of nitrate nitrogen: 22.6 mg/ml;
Degree of charging: 78%;
Content of phosphorus: 5.0 mg/ml;
Degree of charging: about 12%;
Content of sulphur: 0.4 mg/ml;
Degree of charging: about 1%;
Total content of anionically chelated nutrient cations (iron, copper, manganese and zinc): 0.7 mg/ml;
Degree of charging: about 0.7%;
Total content of borate and molybdate: 0.06 mg/ml;
Degree of charging: about 0.2%.

Resin B 1,000 ml of the weakly acid cation exchanger in the acid form used for the preparation of resin C in Example 2 were suspended in a solution of 3.75 g of potassium chloride in 1 l of completely demineralised water, and 183 g of potassium hydroxide (in the form of an 84% strength aqueous solution) were added at 20° to 25° C. in the course of 25 minutes, whilst stirring and cooling. After subsequently stirring the mixture for 3 hours, a pH value of 7.3 had been established in the aqueous phase. 135 ml of aqueous ammonia solution (about 25% strength) were then added dropwise at the above temperature in the course of 2.75 hours. During this addition, the pH value rose to 9.4. After subsequently stirring the mixture for 16 hours, the pH value was 9.2. The weakly acid cation exchange resin thus charged was filtered off. Yield: 1,620 ml of moist cation exchange resin.

Content of potassium: 64 mg/ml;
Degree of charging: 58%;
Content of ammonium nitrogen: 15 mg/ml;
Degree of charging: 38%.

EXAMPLE 5 (COMPARISON EXAMPLE)

To prepare an ion exchanger fertiliser containing the main nutrients nitrogen, phosphorus, potassium and sulphur and the micronutrients boron, iron, copper, manganese, molybdenum and zinc using a weakly basic ion exchanger and a strongly acid ion exchanger, resin A used in Example 4 is first charged, as described. However, the resin is not separated off from the aqueous phase, but after the charging operation, 570 ml of the strongly acid cation exchanger used for the preparation of resin E in Example 2, 51.5 g of potassium hydroxide (85% strength) and 35 g of ammonia solution (about 25% strength) are successively introduced, at room temperature in the course of 2 hours, whilst stirring, into the suspension of the weakly basic anion exchanger which has been charged with nitrate, phosphate, sulphate and the micronutrients.

After subsequently stirring the mixture for 16 hours, the pH value of the aqueous phase was 4.6. The ion exchanger mixture charged with nutrients was separated off from the aqueous phase and partially dried at 90° C. in vacuo (120 mbars) for 24 hours. Yield: 1,040 g of a free-flowing product.

Water content: 6% by weight.
Nutrient content of the fertiliser mixture per 100 g of mixture:

Nitrate nitrogen: 3.2 g
Ammonium nitrogen: 0.6 g
Phosphorus: 0.7 g
Potassium: 2.8 g
Boron: 2 mg
Iron: 91 mg
Copper: 1 mg
Manganese: 6 mg
Molybdenum: 7 mg
Zinc: 1 mg
Sulphur: 1 mg
Weakly basic groups: 288 mmols
Strongly acid groups: 121 mmols

EXAMPLE 6

Fertilising test using ornamental plants in a hydroponic culture

Comparative fertilising tests were carried out on ornamental plants in a hydroponic culture using the fertiliser of Example 4 according to the invention and the fertiliser of Example 5 (comparison example). The fertilisers were applied in commercially available nutrient batteries which were in the form of small boxes (compare M. Schubert, loc. cit., diagram on page 94) and had a restricted diffusion cross-section (dimensions of the plastic batteries: 45×45×20 mm; top and bottom with 13 slit rows each; slit width: 0.05 to 0.3 mm; total slit length per row: 28 mm).

The amounts of fertiliser employed per battery and the amounts of nutrient contained therein are given in Table 1.

TABLE 1

| Amounts of fertiliser per battery | | |
|---|---|---|
| | Fertiliser according Example 4 | Fertiliser according to Example 5 (comparison example) |
| Amount (g) | 9 | 10 |
| Nitrate nitrogen (mg) | 315 | 320 |
| Ammonium nitrogen (mg) | 63 | 60 |
| Phosphorus (mg) | 72 | 70 |
| Potassium (mg) | 270 | 280 |
| Boron (mg) | 0.2 | 0.2 |
| Iron (mg) | 9 | 9 |
| Copper (mg) | 0.1 | 0.1 |
| Manganese (mg) | 0.6 | 0.6 |
| Molybdenum (mg) | 0.6 | 0.7 |

TABLE 1-continued

Amounts of fertiliser per battery

|  | Fertiliser according Example 4 | Fertiliser according to Example 5 (comparison example) |
|---|---|---|
| Zinc (mg) | 0.1 | 0.1 |
| Sulphur (mg) | 0.1 | 0.1 |

The plants were grown in commercially available individual containers which have a water reservoir and in which the nutrient battery is located underneath the plant pot (growing pot). Relatively long diffusion paths for the nutrients thus result. Expanded clay was used as the plant substrate. Drinking water which had a low salt content and a specific conductivity of 100 μS/cm at 20° C. was used as the water for the plants.

The experiments were carried out on 4 ornamental plant varieties: *Ficus benjamina, Rhaphidophora aurea, Dieffenbachia amoena* "Tropic White" and *Dracaena massangeana*.

4 Plants were used for each experimental variant. As soon as the fertilising action of the fertilisers was exhausted, the old batteries were replaced by new ones. The total experimental period (growing time) varied between 229 and 345 days, depending on the plant variety, using 2 nutrient batteries per plant, compare Table 2.

At the end of the experiment, the plants were evaluated from general horticultural viewpoints—such as quality, leaf colour and habit—and the additional growth was determined (end weight minus initial weight). In the case of the rhaphidophora, the additional growth is obtained from the weight of the tendrils cut off. In addition, the length of leaves and the number of leaves were determined in the case of the dieffenbachia and dracaena, and the number of new shoots was determined in the case of the rhaphidophora. Table 2 gives the results obtained, as average values for each plant variety.

TABLE 2

Plant growth and plant evaluation

| Plant variety Growth Parameters | | Growing time [days] | Fertiliser according to Example 4 | Fertiliser according to Example 5 (comparison example) |
|---|---|---|---|---|
| *Ficus benjamina* | | 229 | | |
| Evaluation | | | 2.5 | 3.5 |
| Additional growth: | g | | 176 | 142 |
| | % | | 124 | 100 |
| *Rhaphidophora* | | 266 | | |
| Evaluation | | | 2 | 4 |
| Tendrils: | g | | 109 | 86 |
| | % | | 127 | 100 |
| Number of shoots | | | 6.75 | 5.25 |
| *Dieffenbachia* | | 288 | | |
| Evaluation | | | 2 | 3 |
| Additional growth: | g | | 230 | 170 |
| | % | | 135 | 100 |
| Length of leaves: | cm | | 29.0 | 26.2 |
| | % | | 110 | 100 |
| *Dracaena* | | 345 | | |
| Evaluation | | | 2 | 3.5 |
| Additional growth: | g | | 104 | 72 |
| | % | | 144 | 100 |
| Number of leaves | | | 15 | 11 |

[1] Evaluation ratings 1 to 5; rating 1 corresponds to a very good plant quality It can be seen, from Table 2, that average evaluation ratings of about 2 were found for all plant varieties at the end of the growing time when the fertiliser, according to the invention, of Example 4 was used. This corresponds to a good plant quality. In contrast, all the plants from the comparison experiments with the fertiliser according to Example 5 (comparison example) were evaluated as 1 to 2 points poorer. It can also be seen from Table 2 that the plants supplied with the fertiliser according to the invention exhibited a considerably better growth. If the value found for the additional growth of the plants supplied with the fertiliser according to Example 5 (comparison example) is set at 100% in each case, the results, by comparison, for the plants supplied with the fertiliser according to the invention are 124% in the case of *Ficus benjamina*, 127% in the case of Rhaphidophora, 135% in the case of *Dieffenbachia amoena* and 144% in the case of *Dracaena massangeana*. The better growth with the fertiliser according to the invention can also be seen from the increased number of shoots in the case of the rhaphidophora, the larger leaves (leaf length) in the case of the dieffenbachia and the higher number of leaves in the case of *Dracaena massangeana*.

Comparable experimental results were obtained where resin A and resin B from Example 4 were employed, separately from one another, in a 2-chamber battery instead of in a 1-chamber nutrient battery, or each resin was filled into a fleece bag by itself and the fleece bags were suspended in the aqueous phase.

EXAMPLE 7

To prepare an ion exchanger fertiliser containing the main nutrients nitrogen, phosphorus, potassium and calcium and the micronutrients iron and manganese, the nutrient-charged exchange resins A, B and C described in Example 2 and exchange resin D described below are mixed in the amount given in the following table. A fertiliser with a nutrient content which can likewise be seen from the table is obtained.

TABLE

| Resin | Amount [g] | Amount of ion-exchanging groups [mmols/100 g of mixture] | | | Nutrient | Nutrient [g/100 g of mixture] |
|---|---|---|---|---|---|---|
| | | weakly basic | strongly basic | weakly acid | | |
| A | 44 | 163 | — | — | nitrate nitrogen | 3.1 |
| | | | | | iron | 0.6 |
| B | 8 | 20 | 4 | — | phosphorus | 0.8 |
| | | | | | manganese | 0.1 |
| C | 8 | — | — | 60 | potassium | 3.3 |
| D | 4 | — | — | 26 | calcium | 0.8 |

The content of weakly acid groups in the mixture is 32% (relative to the total amount of weakly acid groups and weakly basic groups).

Resin D 420 ml of the weakly acid cation exchanger in the acid form used for the preparation of resin C in Example 2 were suspended in 300 ml of tapwater, and 75 g of technical-grade calcium hydroxide (95% strength) were added at room temperature, whilst stirring.

After subsequently stirring the mixture for 20 hours, the pH value in the aqueous phase was 9.7. The cation exchange resin thus charged was rinsed in a filter column until the runnings were clear and then isolated by filtration and dried in air at room temperature for 48 hours. Yield: 293 g of a free-flowing product.

Content of calcium: 125 mg/g
Degree of charging: 95%
Water content: 23%.

What is claimed is:

1. A process for improving the plant growth with the aid of ion exchanger fertilisers, comprising adding to the growth medium one or more weakly basic anion exchanger(s) which is (are) charged with anionic chelate complexes of micronutrient cations and macronutrient and micronutrient anions to the extent of at least 60% of its (their) total capacity together with one or more weakly acid cation exchanger(s) charged with nutrient cations to the extent of at least 60% of its (their) total capacity.

2. The process of claim 1, wherein the weakly basic anion exchanger(s) and the weakly acid cation exchanger(s) are each charged with nutrient ions to the extent of at least 80% of their total capacity.

3. A process according to claim 1, wherein the highly charged weakly basic and weakly acid ion exchangers are employed in a ratio such that the amount of weakly acid groups is 10 to 90%, relative to the sum of weakly basic groups and weakly acid groups.

4. A process according to claim 3, characterised in that the highly charged weakly basic and weakly acid ion exchangers are employed in a ratio such that the amount of weakly acid groups is 10 to 50%, relative to the sum of weakly basic groups and weakly acid groups.

5. A process according to claim 1, wherein the ion exchanger fertilizer is applied in an amount of between 0.001 and 0.1 liters of ion exchanger per liter of plant growth medium.

6. A process according to claim 1, wherein the ion exchanger fertiliser is applied in an amount of between 0.002 and 0.05 liters of ion exchanger per liter of plant growth medium.

7. A fertiliser on the basis of a mixture of one or more weakly basic anion exchangers charged with anionic chelate complexes of micronutrient cations and other micronutrient and macronutrient anions, and one or more cation exchangers charged with nutrient cations, comprising a mixture of weakly basic anion exchanger(s) which is (are) charged with anionic chelate complexes of micronutrient cations and other micronutrient and macronutrient anions to the extent of at least 60% of its (their) total capacity and weakly acid cation exchanger(s) which is (are) charged with nutrient cations to the extent of at least 60% of its (their) total capacity.

8. A fertiliser of claim 7, wherein the weakly basic anion exchanger(s) and the weakly acid cation exchanger(s) are each charged with nutrient ions to the extent of at least 80% of their total capacity.

9. The fertiliser of claim 7, wherein the amount of weakly acid groups is 10 to 90%, relative to the sum of weakly basic groups and weakly acid groups.

10. The fertiliser of claim 7, wherein the amount of weakly acid groups is 10 to 50%, relative to the sum of weakly basic groups and weakly acid groups.

11. The fertiliser of claim 7, wherein 0.25 to 25% of the total capacity of the weakly basic anion exchangers charged with anionic chelate complexes of micronutrient cations and micronutrient and macronutrient anions is taken up by the anionic chelate complexes.

12. The fertiliser of claim 7, wherein 0.5 to 15% of the total capacity of the weakly basic anion exchangers charged with anionic chelate complexes of micronutrient cations and micronutrient and macronutrient anions is taken up by the anionic chelate complexes.

13. A fertiliser according to claim 7 which also contains a strongly basic and/or strongly acid ion exchanger charged with nutrient ions.

14. A fertiliser according to claim 13, wherein the strongly basic groups amount to up to 80% of the total anion exchange capacity and/or the strongly acid groups amount to up to 80% of the total cation exchange capacity.

15. A fertiliser according to claim 14, characterised in that the strongly basic groups amount to up to 50% of the total anion exchange capacity and/or the strongly acid groups amount to up to 50% of the total cation exchange capacity.

* * * * *

UNITED STATES PATENT AND TRADEMARK OFFICE
CERTIFICATE OF CORRECTION

PATENT NO. : 4,396,412
DATED : August 2, 1983
INVENTOR(S) : Harold Heller et al

It is certified that error appears in the above-identified patent and that said Letters Patent is hereby corrected as shown below:

Col. 6, line 68            Delete "Vitris" and insert --Vitis--

Col. 8, lines 42,43       7th column, under "nitrite nitrogen" insert --iron--; 8th column, under "2.9" insert --0.6--

Signed and Sealed this

Twenty-fourth Day of January 1984

[SEAL]

Attest:

GERALD J. MOSSINGHOFF

Attesting Officer      Commissioner of Patents and Trademarks